United States Patent Office 2,846,370
Patented Aug. 5, 1958

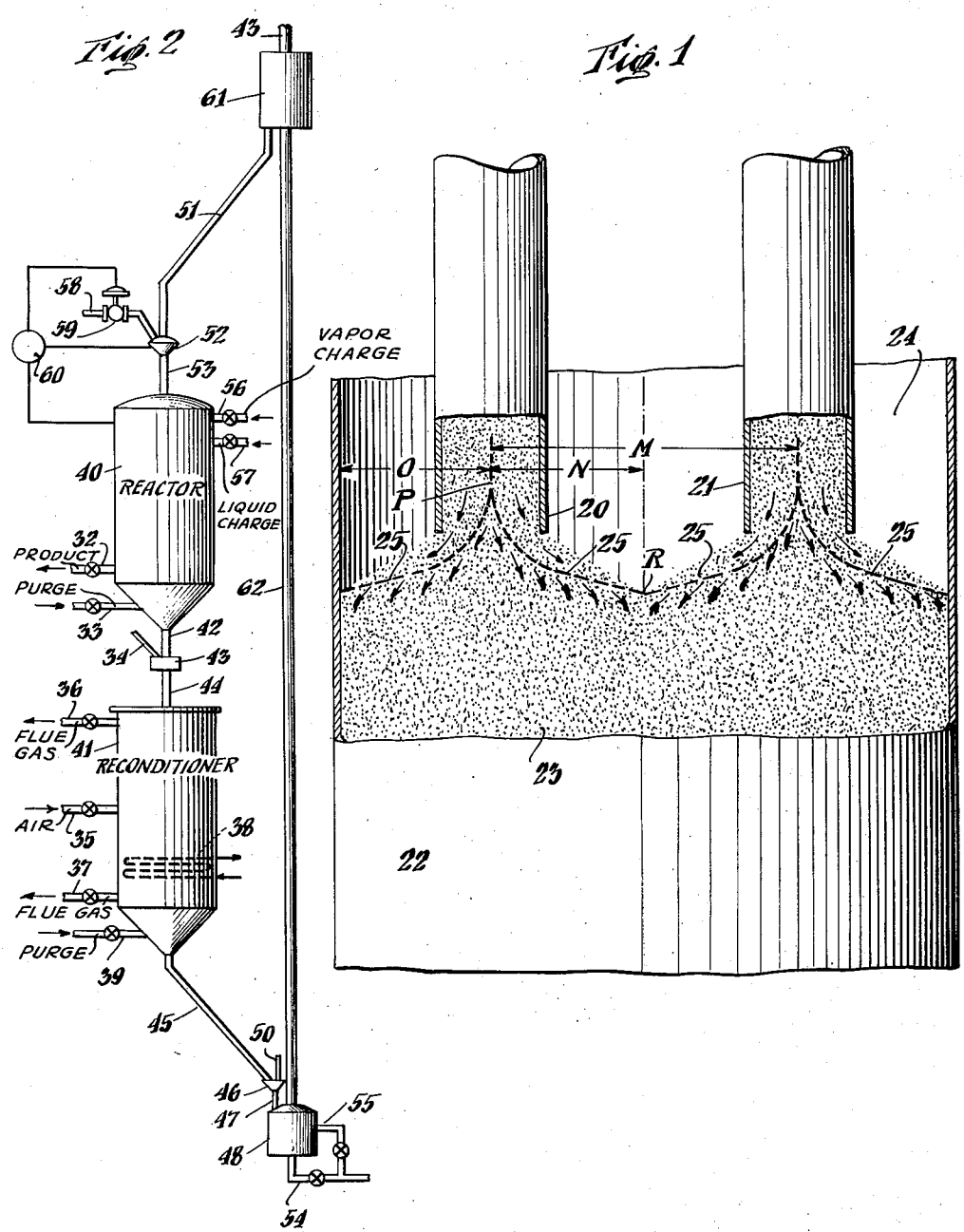

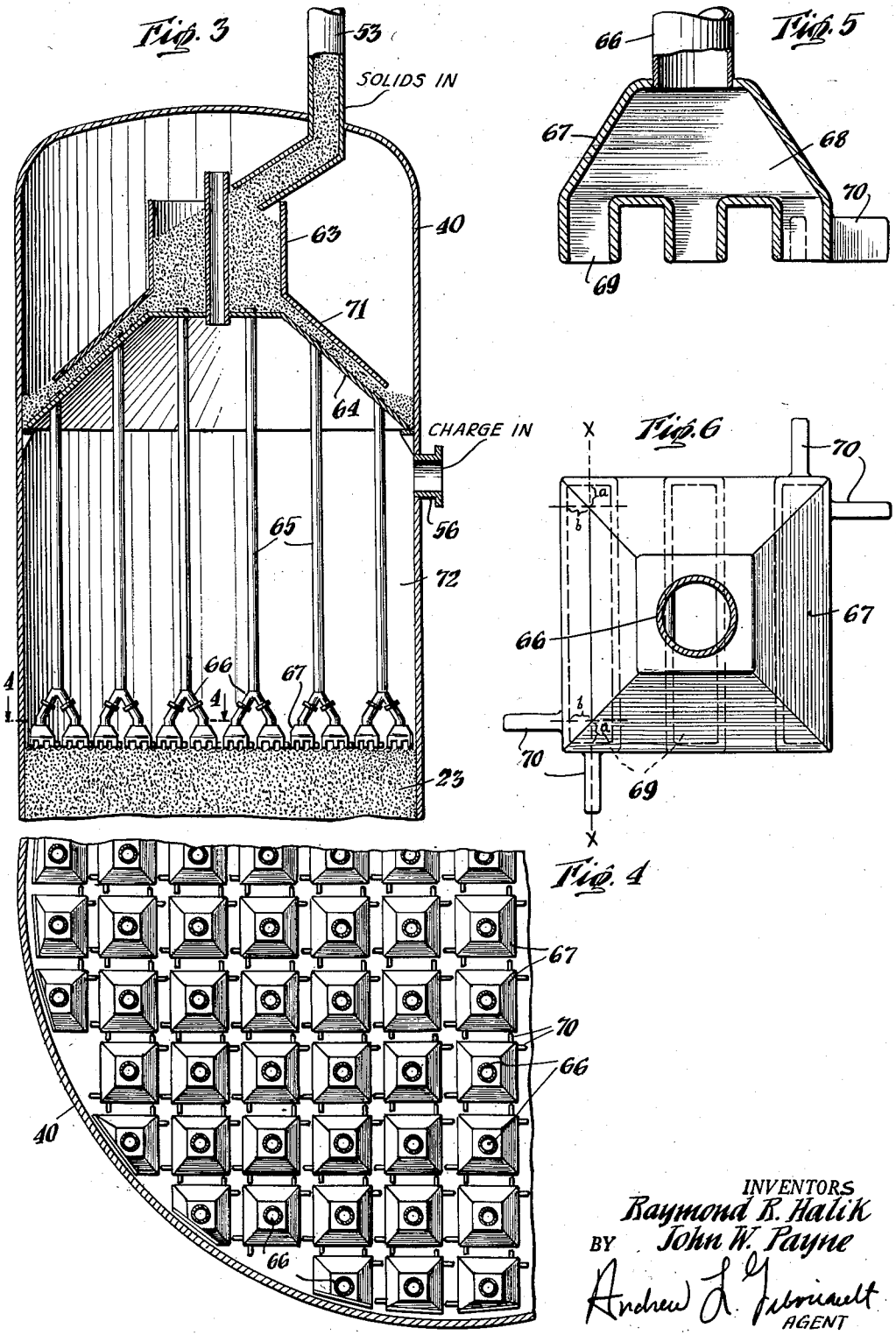

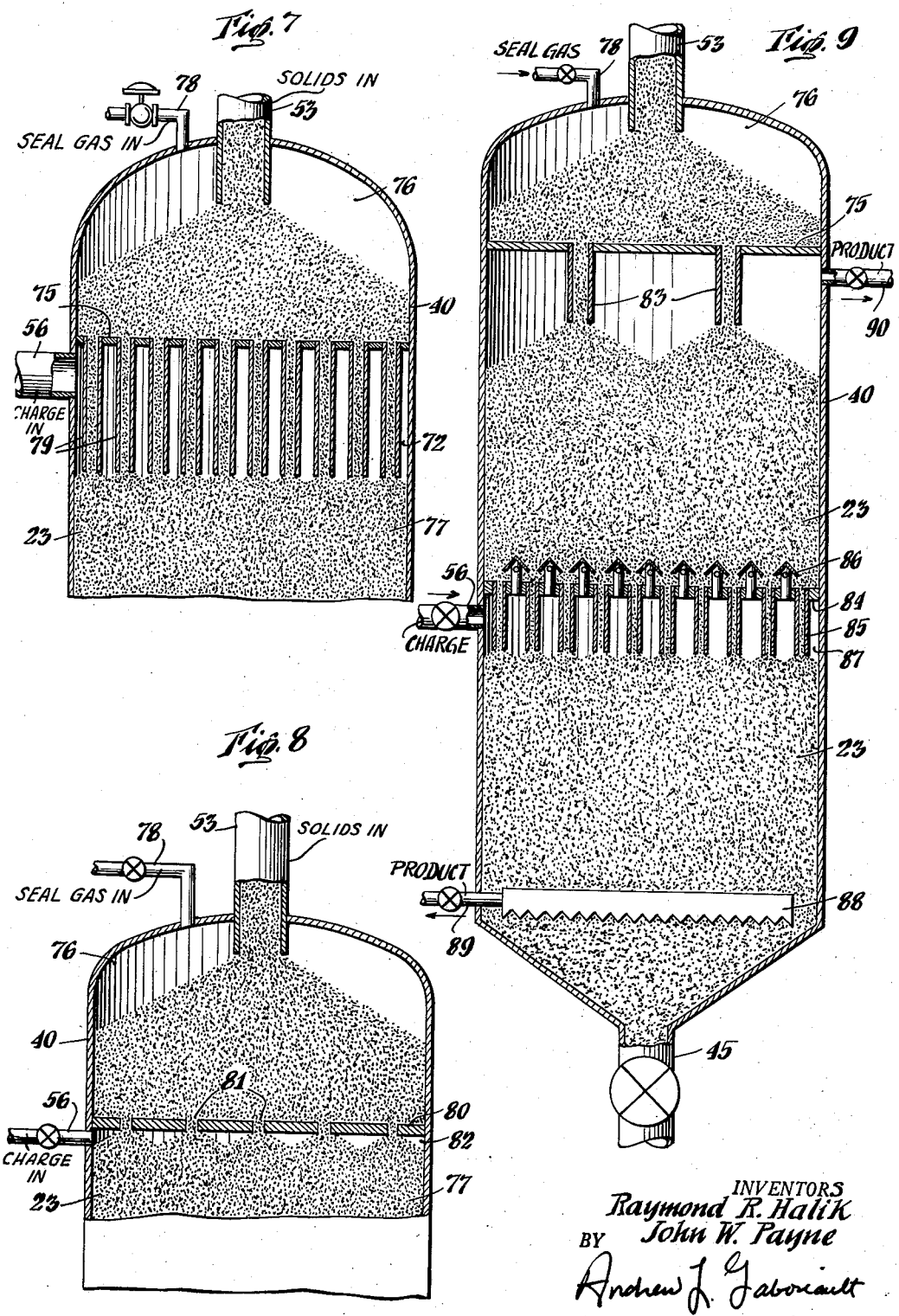

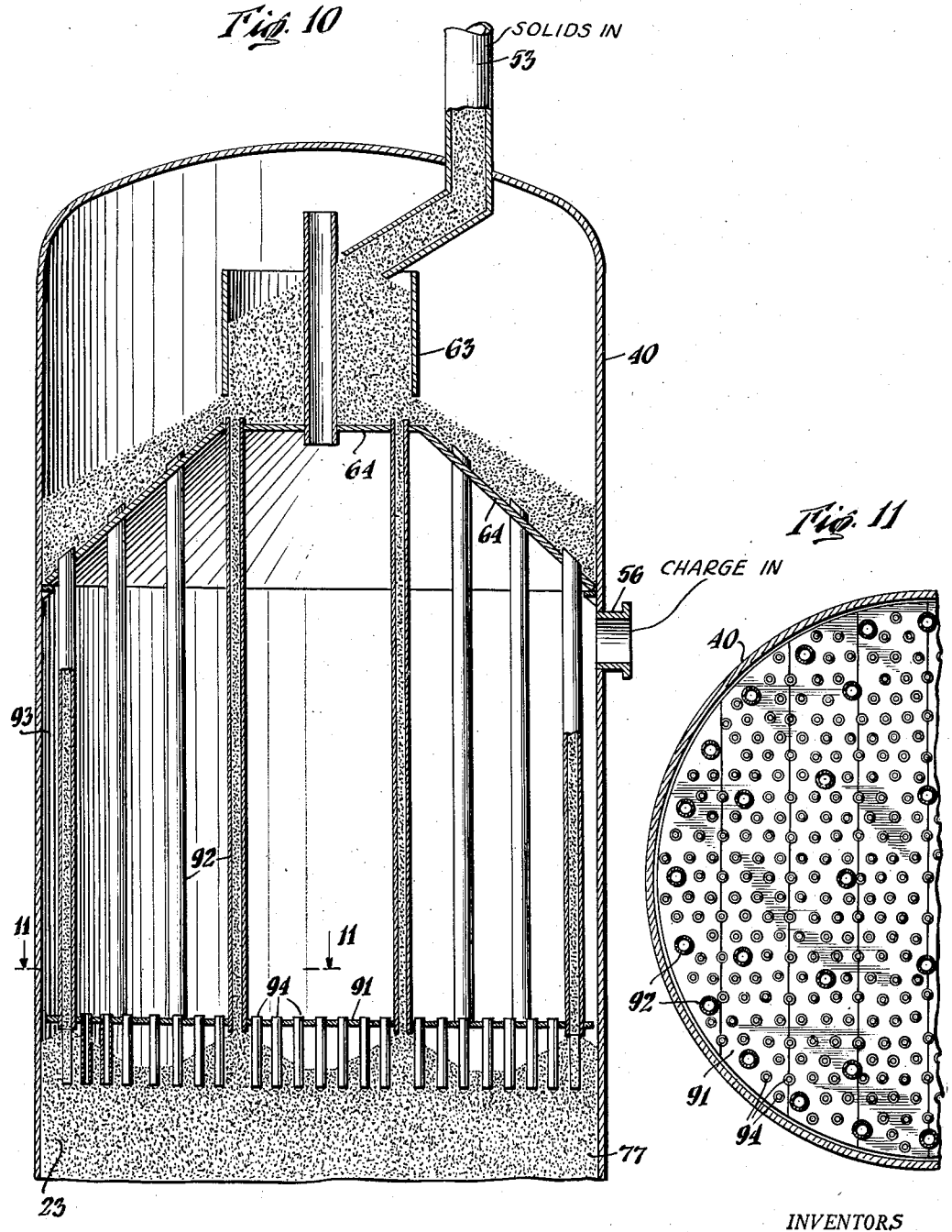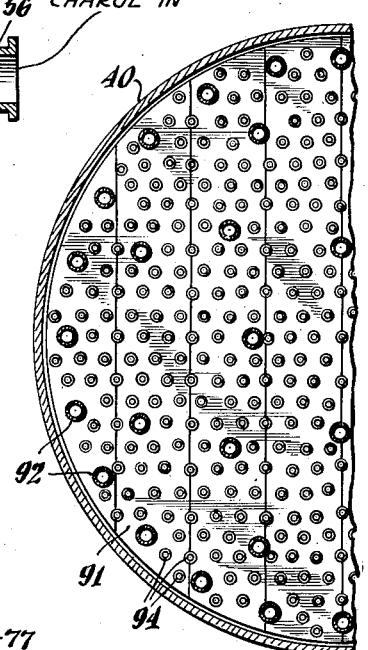

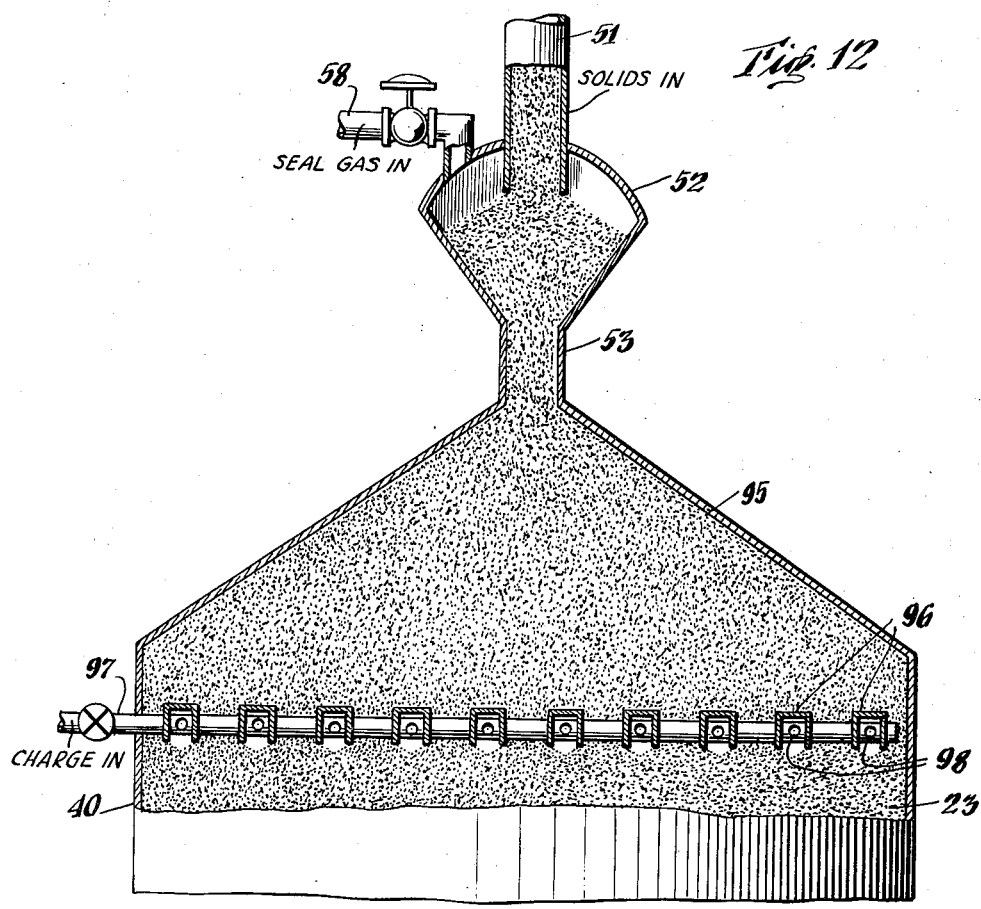
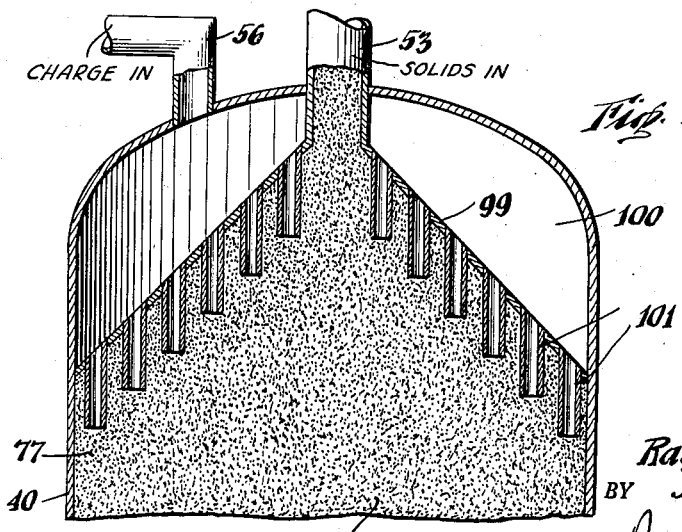

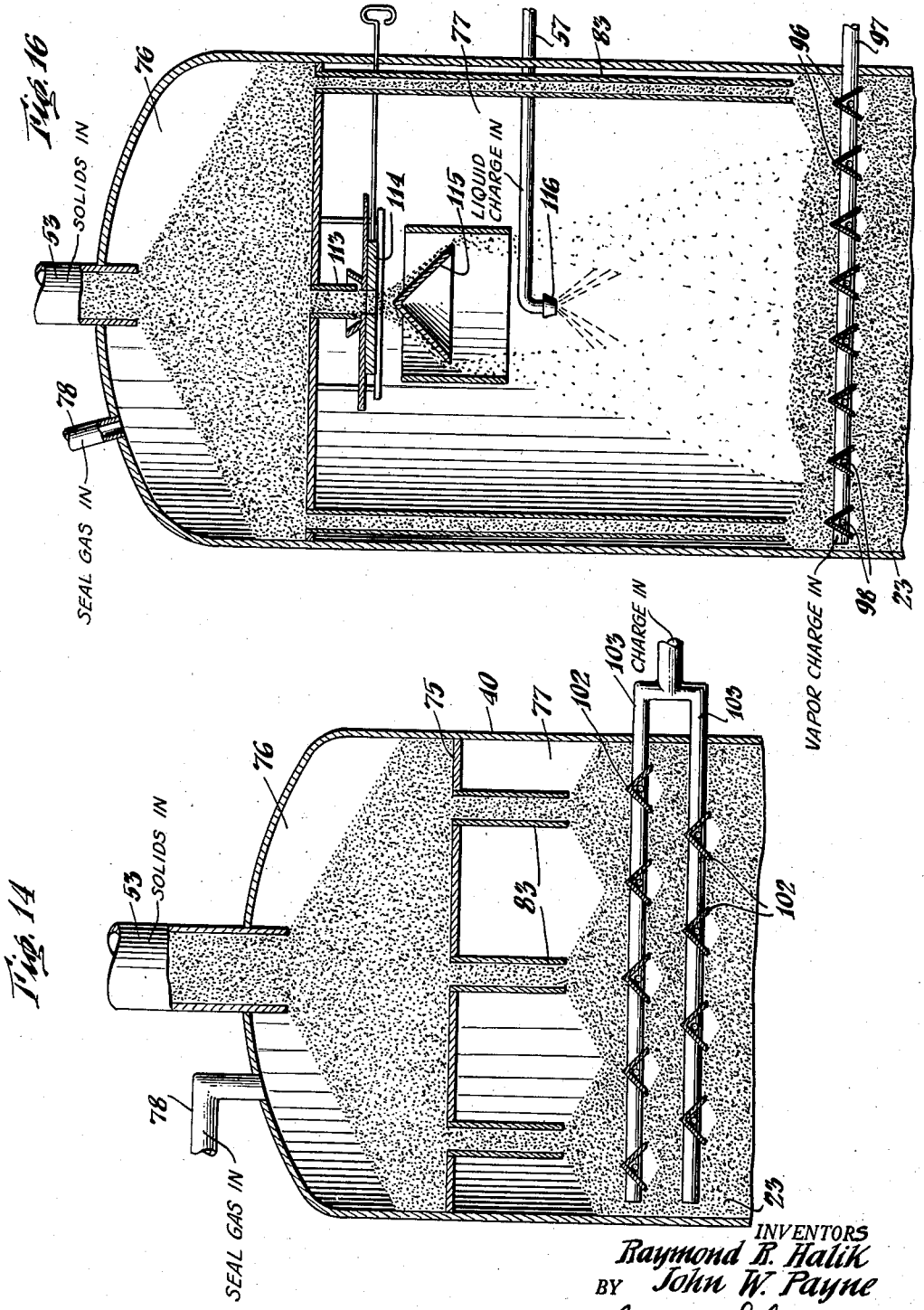

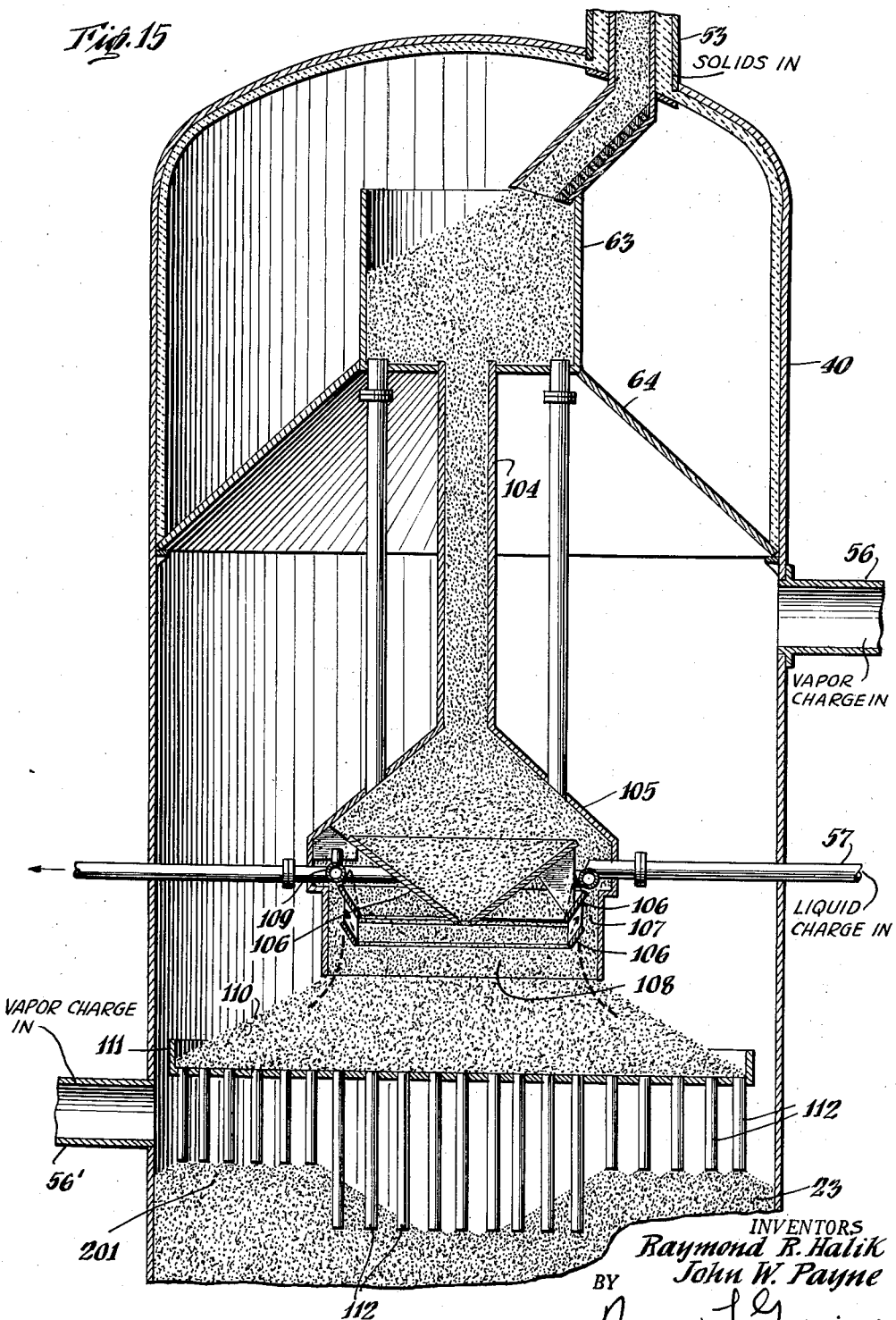

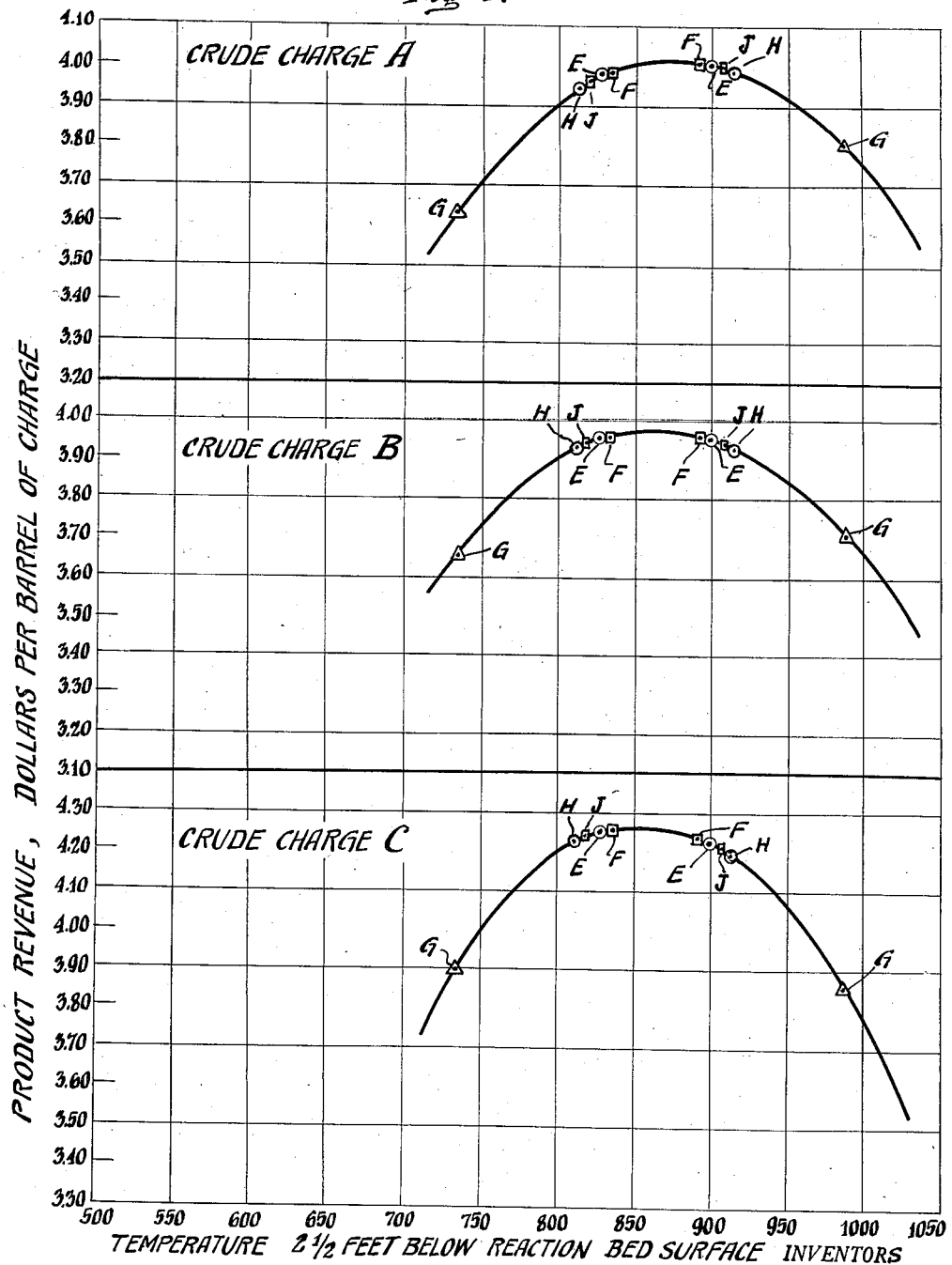

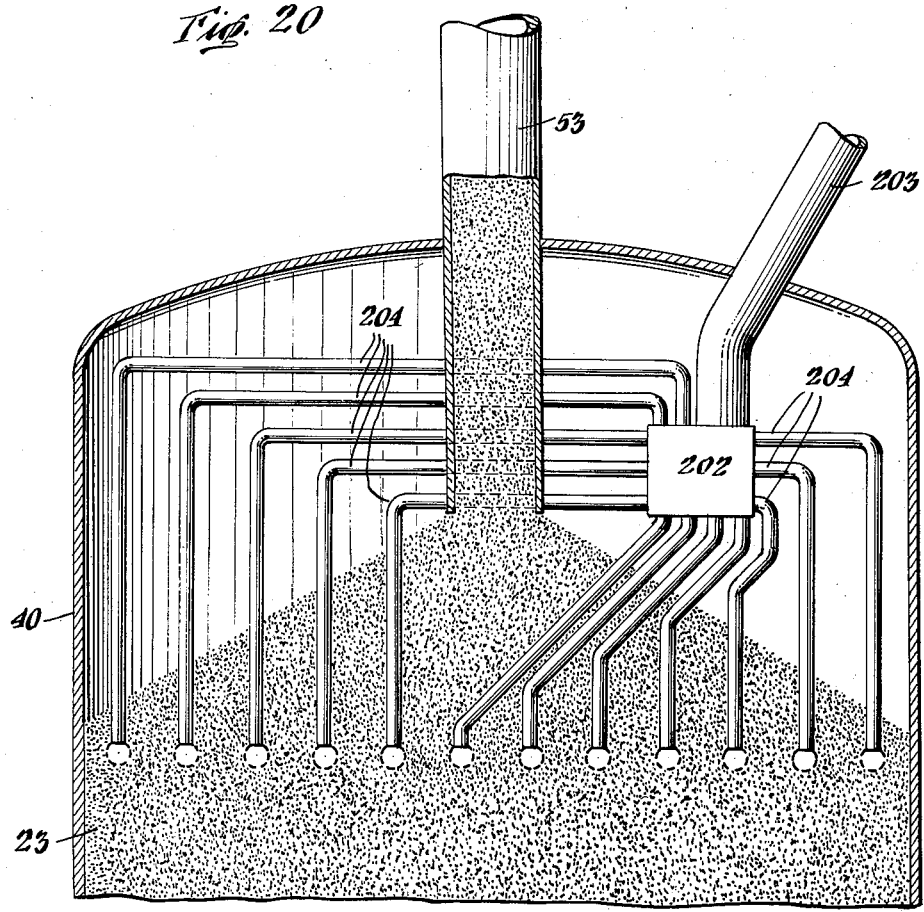

2,846,370

METHOD AND APPARATUS FOR FEEDING HYDROCARBONS AND SOLID PARTICLES IN A MOVING BED CONVERSION PROCESS

Raymond R. Halik, Pitman, and John W. Payne, Woodbury, N. J., assignors to Socony Mobil Oil Company, Inc., a corporation of New York Application August 17, 1955, Serial No. 529,063

14 Claims. (Cl. 196—52)

This application is a continuation-in-part of our application Serial No. 338,774, filed February 25, 1953.

This invention is concerned with the thermochemical conversion of fluid reactants in the presence of a moving mass of granular solids which may or may not exhibit catalytic properties with respect to the conversion reaction. Particularly, this invention is concerned with a method and apparatus for supplying granular solids and fluid reactants at substantially different temperatures to a moving mass of granular solids so as to avoid excessive temperature gradients across the mass.

Typical of the processes to which this invention applies is the catalytic conversion of high boiling fluid hydrocarbons to lower boiling gaseous products by passing the fluid hydrocarbon charge downwardly through a bed of downwardly-moving, granular, catalytic contact material particles at temperatures of the order of 850° F. and upward. Other exemplary processes include the catalytic reforming, alkylation, desulfurization, aromatization, isomerization, hydrogenation, hydroforming, dehydrogenation, treating, and the like, of a fluid hydrocarbon charge in the presence of a suitable granular catalyst and the thermal cracking, coking, visbreaking, and the like, of fluid hydrocarbons in the presence of a granular inert contact material.

Suitable contact material may vary widely in nature, depending on the particular process to which this invention is applied. For example, suitable contact material which will exert a catalytic effect on the conversion reaction may partake of the nature of natural or treated clays, bauxite, activated alumina or synthetic associations of silica, alumina, or magnesia, or combinations thereof, to which certain metals, metallic oxides or sulfides may be added in small amounts for specific purposes. Contact material which is inert in character may partake of the form of refractory materials, such as zirkite, corhart or mullite, or it may partake of the form of stones or metallic particles or balls. In any case, it is desirable to maintain the contact material particles within the size range 1 inch to 60 mesh, and preferably 3–14 mesh by Tyler Standard Screen Analysis. The term "granular" is used in describing and claiming this invention to refer to articles of palpable particulate form, like those of the above sizes, as distinguished from finely divided powders, whether of regular shape, such as pellets, tablets, or spheres, or irregular shape, such as obtained from grinding and screening operations.

This invention will be best understood by referring to the attached drawings of which:

Figure 1 is a sectional view illustrating the flow of granular solids across a contact material bed from two inlet passageways.

Figure 2 is an elevational view showing a typical hydrocarbon conversion process to which this invention may be applied.

Figure 3 is an elevational view, partially in section, of the upper section of a hydrocarbon conversion reactor employing one form of this invention.

Figure 4 is a sectional view along line 4—4 of Figure 3.

Figure 5 is an elevational sectional view of one of the granular solids distributors of Figure 3.

Figure 6 is a plan view of one of the granular solids distributors of Figure 3.

Figure 7 is an elevational view, partially in section, of the upper section of a reactor employing a simplified form of this invention.

Figure 8 is an elevational view, partially in section, of the upper section of a reactor employing a further modified form of this invention.

Figure 9 is an elevational view, partially in section, of a reactor employing another form of this invention.

Figure 10 is an elevational view, partially in section, of the upper section of a reactor employing still another form of this invention.

Figure 11 is a sectional view along line 11—11 of Figure 10.

Figure 12 is an elevational view, partially in section, of the upper section of a reactor employing another form of this invention.

Figure 13 is an elevational view, partially in section, of the upper section of a reaction vessel employing still another form of this invention.

Figure 14 is an elevational view, partially in section, of the upper section of a reactor employing a still further modified form of this invention.

Figure 15 is an elevational view, partially in section, of the upper section of a reactor employing another form of this invention.

Figure 16 is an elevational view, partially in section, of the upper section of a reactor employing still another form of this invention.

Figure 17 is a graph illustrating the varition in product revenue with conversion temperature for three different crude charge stocks.

Figure 20 is an elevational sectional view of the upper section of a hydrocarbon conversion reactor employing this invention in connection with the liquid component of the hydrocarbon charge.

All of these drawings are diagrammatic in form and like parts in all bear like numerals.

Figure 18:
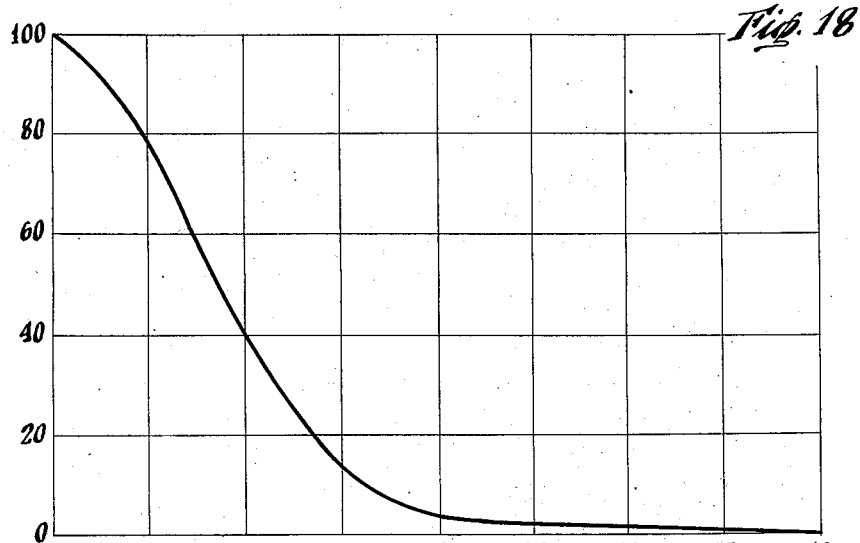
Figure 18 is a graph relating the spacing of granular solids, inerts or gaseous reactant inlets to the possible increase in product revenue that can be achieved thereby over the prior art wide spacing.

In processes of the aforementioned types, it is usual to maintain a substantially compact bed of granular solids within a reactor with a gas plenum space above the bed in open communication with the upper surface of the bed. Used granular solids are removed from the lower section of the bed to promote downward movement of the granular solids through the bed, and fresh granular solids are continuously supplied to the upper section of the bed at one or more widely spaced points to replenish the supply of granular solids therein. Gaseous reactants are supplied to the plenum space and pass therefrom into the upper end of the bed. It has been found that where the gaseous reactant and granular solids are supplied to the bed at substantially different temperatures, the prior art system described above gives rise to excessive temperature gradients across the bed which result in uneven conversion of the gaseous reactants and substantial reduction of the revenue that can be realized from the product. This will be most easily understood by referring to Figure 1 and by considering, as an example, that figure in connection with the conversion of high boiling vaporized hydrocarbons to lower boiling products. In such a conversion, it is frequently desirable to pass the vaporized charge downwardly concurrently through the compact bed of granular solids. It is normally necessary to introduce the vaporized hydrocarbon charge, which may be the total charge or only a portion thereof, to the reactor at a temperature substantially below the optimum conversion temperature. This comes about because the optimum conversion temperature is ordinarily above the temperature at which the vaporized charge will undergo thermal decomposition, and it is highly desirable to avoid such thermal decomposition within the vapor feed preheater and transfer system to the reactor. As a result, the vaporized charge is supplied to the reactor at a temperature well below the optimum conversion temperature and heat required to raise the vapor to the optimum temperature as well as the heat required to effect the conversion reaction, if it is endothermic, is supplied to the reaction zone by some other means. The most common and the simplest way of accomplishing this is to supply the granular solids to the reaction zone at a temperature suitably above the optimum conversion temperature to furnish this heat without dropping below the optimum conversion temperature. When it is stated that the contact material or granular solids are supplied to the conversion or reaction zone at "a temperature suitable to supply the heat required by the conversion reaction," it is meant, in the describing and claiming of this invention, that the temperature of supply of the contact material is sufficiently above the optimum conversion temperature to supply both the actual heat of reaction and the heat required to elevate the total hydrocarbon charge to the optimum conversion temperature.

Referring now to Figure 1, there is shown there the walls of the reactor 22 with contact material bed 23 therein. This bed is supplied with contact material through two conduits 20 and 21, while the vaporized hydrocarbon charge is supplied to the plenum space 24 above bed 23. The dotted lines 25 denote the pattern of contact material flow within the lower section of the conduits 20 and 21 and over the surface of bed 23. The velocity of contact material in bed 23 is substantially uniform all across the bed at any level below lines 25. Likewise, the particles in the bed below lines 25 flow downwardly substantially unidirectionally. The contact material particles in the streams in conduits 20 and 21 also flow in a substantially vertical direction and at a constant velocity until the point P is reached. Below this point the particles between the two lines 25 continue substantially vertically downwardly at a lower velocity, while the particles between lines 25 and the walls of the conduit pass at a higher velocity in an outwardly inclined direction. Upon being emitted from the conduit, these latter particles flow across the bed 23 in transverse layers, which lie between lines 25 and the upper end of the bed 23 to supply that portion of the bed not directly beneath the conduit. While this explanation has been made on a two dimentional basis, it is obvious that in actual practice with three dimensions, the lines 25 are actually surfaces of flow and the particles above them exist in a conical-shaped layer. Particles continually drop out of this layer to supply the bed therebelow, as indicated by the arrows below lines 25. The lower temperature vaporized charge passes from plenum space 24 substantially vertically downwardly through this transversely flowing layer, which results in cross-flow of hot contact material particles and cooler vapor. In addition, within the bed, some of the cooler vapor flows across the vertically flowing contact material to supply the region directly beneath conduits 20 and 21 with vapor again resulting the cross-flow. Now, any given particle in the layer between lines 25 and the upper end of bed 23 will be cooled by constant contact with the cooler vapor flowing through the layer an amount equal to the length of time it remains in the layer, which in turn is dependent on the distance it travels in the layer. Once a particle leaves the layer, it flows vertically with the vapor and the two may arrive at an equilibrium temperature; but no equilibrium is possible while the particle remains in the layer except at the temperature of the vapor which is far below the optimum temperature. Thus, a particle in this layer is cooled an amount dependent on its distance of travel in the layer, the particles reaching point R, where transverse flow ceases, being cooled most. Also, the transversely flowing vapor which passes under conduits 20 or 21 causes cooling of the contact material there, the particles directly beneath the edges of the conduit being cooled most by the transversely flowing vapor, since these contact the most vapor at its lowest temperature while particles beneath the center of the conduit, point P, are cooled the least, since they contact the smallest amount of vapor, and vapor which has already been heated by contact with other particles. The over-all result is that a hot spot occurs in the bed beneath the point P, while a cold spot occurs beneath point R, with temperatures of intermediate magnitude therebetween. The relative magnitude of the temperatures at these two points will depend on the distance between conduits 20 and 21 edge-to-edge, which determines the length and size of the transversely flowing contact material layer, and the lateral dimensions of conduits 20 and 21, which detemine the quantity and distance the vapor must flow transversely. Both of these limits may be expressed in one dimension, the dimension N, which is the distance of actual lateral contact material flow from any one conduit. Where a plurality of conduits are used, the dimension M, the center-to-center distance between contact material feed points, may be used. Where this dimension is too large, for example, 39 inches center-to-center, which was the closest spacing used under the prior art, the temperature gradients across the bed 23 might be several hundred degrees. In the prior art system, this temperature differential was not dissipated as the particles progressed through the bed, either by heat transfer or mixing of the contact material particles as they flow through the bed; nor is there sufficient interchange of vapors across the bed to accomplish uniformity of temperature across the bed. The result is that the hydrocarbon charge is subjected to an uneven conversion with much of the reaction occurring at temperatures widely removed from the optimum conversion temperature, both above and below. This effects a marked decrease in the value of the resultant products.

When the process is one wherein the fluid reactants are supplied to the reaction zone at a higher temperature than the granular solids, the situation is reversed and a point directly below point P will be the coolest point, while one below point R is the hottest. The undesirable results are obviously the same, however.

Another system suggested by the prior art for supplying gaseous reactants to compact contact material reaction beds is to supply the reactant at one or more laterally spaced-apart points beneath the surface of the reaction bed. The closest spacing for these points suggested by the prior art is 44 inches. With such a wide spacing, when the reactant and contact material are at different temperatures, temperature gradients similar to those noted above will be encountered. The reactant from each supply point will flow laterally across the downwardly flowing contact material between the reactant supply points to fill the reaction bed and a temperature gradient will be set up in the manner noted above. In addition, since each reactant supply point must in fact be an area of supply with some substantial width, contact material particles, in filling in the area beneath the reactant supply apparatus, will flow across the reactant as it enters the bed. Thus, where the reactant is cooler than the contact material, for example, a point of minimum temperature will occur beneath each area of reactant supply, while a point of maximum temperature will occur half way between adjacent areas of reactant supply. This system is, then, equivalent to the system where vapor is supplied to the upper end of a compact bed between contact material supply passages. This equivalency is apparent when it is recalled that the reaction bed proper only exists below the level of reactant supply to a compact bed. At this level, with either system, there will be alternate areas of contact material and reactant supply along any given line.

When a liquid or mixed phase charge is supplied to a conversion zone and injected into the compact reaction bed therein at widely spaced locations, temperature gradients will be set up, in a manner similar to that outlined above, by vapor formed from the liquid or supplied with it flowing laterally across the descending contact material. In addition, the liquid portion of the charge must be vaporized and only that contact material which is wetted by the liquid will be able to furnish the heat required to effect the vaporization or initial cracking required to put the liquid into the vapor state. This will, in the main, be only contact material located close to the injection point and will result in the contact material at the injection point being even further reduced in temperature over the reduction that would be expected if cold vapor only were injected. The undesirable loss in product revenue occurs, then, with widely spaced liquid injection points as well as with widely spaced vapor supply points.

Temperature gradients across the reaction bed have additional deleterious effects where the system is a catalytic hydrocarbon conversion process. The granular catalyst used here must be regenerated for re-use in the conversion zone by burning off the coke deposited thereon in the conversion zone. Where the temperature across the reaction bed is uneven, more coke will be deposited on the hot particles of catalyst than on the cooler particles. Solid catalyst normally cannot be heated beyond a certain temperature, typically about 1300° F., or it will be permanently damaged. Now, if the catalyst having the most coke on it enters at the highest temperature as here, conditions in the regenerator will have to be adjusted to prevent this catalyst from overheating. But, when this adjustment is made, the parts of the kiln operating on the low coke-low temperature catalyst are not operating at full capacity. This results in an over-all decrease in regenerator capacity from what would be obtained if the catalyst entered at a uniform temperature and coke level.

A further disadvantage of this temperature differential in catalytic conversion system reaction beds is that some of the cooler catalyst carries with it from the conversion zone partially cracked charge and other adsorbed material. This material may not even be removed by purging but upon entering the regenerator will vaporize and be carried out with the effluent flue gas to be lost from the system.

A major object of this invention is to provide a method and apparatus for introducing granular solids and fluid reactants at different temperatures to a bed of granular solids which overcomes the above-described difficulties.

Another object of this invention is to provide a method and apparatus for the introduction of granular solids and fluid reactants at substantially different temperatures to a compact bed of the granular solids so as to avoid excessive temperature gradients across the bed.

Another object is to provide a method and apparatus for the conversion of fluid reactants in the presence of granular solids which realizes the maximum in product revenue from the reactants when they must be supplied to the bed at a substantially different temperature than the solids.

Another object is to provide an efficient and economical system for the conversion of fluid hydrocarbons to valuable products in the presence of granular solids in which the entering granular solids supply the heat required by the conversion reaction.

These and other objects will be apparent from the following discussion of the invention.

Broadly, this invention provides for the introduction of granular solids and fluid reactants at substantially different temperatures to a moving bed of solids in a confined reaction or conversion zone so as to avoid excessive temperature gradients across the bed, by supplying the granular solids and reactants to the bed in at least two separate confined feed streams delivering to adjoining portions of the bed cross-section. The contact material, after leaving its feed stream, flows laterally into the portion of the bed supplied directly with reactants and a portion of the reactants flow laterally into the portion of the bed cross-section supplied directly with solids. The dimensions of the streams are controlled so as to limit the lateral flow of the solids and the lateral flow of the reactants each to less than about 10 inches. This distance is measured from the point where lateral flow begins, that is, a point like P in Figure 1, to the point where lateral flow from the stream stops, a point like R of Figure 1. By so limiting the lateral flow, it has been found that substantial temperature gradients across the moving bed are eliminated, regardless of the diversity in temperatures of the solids and the reactants. While there may be, within this limitation, some temperature differential at the upper end of the bed, this is quickly minimized as the contact material flows downwardly through the bed so that there is no significant differential shortly below the bed surface.

Less broadly, this invention involves supplying the granular solids or reactants to the bed as a plurality of streams which are spaced less than 20 inches apart center-to-center. The phrase "center-to-center" has a specific meaning in the description and claims of this invention. It is used herein, in the case of supply passages or conduits having circular or square horizontal cross-sectional shapes at their lower ends, to mean the distance between the center points of the lower ends of adjacent passages. Where the horizontal cross-sectional shape at the lower end is other than circular or square, the phrase "center-to-center" means the nearest distance between central lines extending horizontally along the horizontal planes at the downwardly facing, open lower ends of adjacent passages, which central lines in the case of each supply passage, is a line extending along the longer axis of symmetry of the lower end of the passage from a point adjacent one end of the passage cross-section, which point is equidistant from that end and the sides of the lower end of the passage parallel to said line, to a similarly located point adjacent the other end of the passage cross-section.

This may be illustrated by referring momentarily to Figure 6, which shows three granular solids feed passages 69 of rectangular cross-sectional shape side by side. The one on the left has a long axis of symmetry X—X. The line from which measurement is made extends along X—X from the point at one end where $a=b$ to the point at the other end where $a=b$. The distance $b$ is always measured perpendicular to the walls of the passage. Now, where both the axes of symmetry in the horizontal plane are of equal length, as for circular, square, and like shapes, the length of the line defined above will be zero and measurement is made from the intersection of the axes.

This invention will be described in connection with a single system employing fluid reactants and granular solids, a system for the catalytic conversion of fluid hydrocarbons, at least partially in the vapor state, to gaseous products wherein the heat required by the conversion reaction is supplied by the incoming granular solids. This is done for the purpose of clarity and should not be construed as limiting the invention to that system.

Turning to Figure 2, there is shown therein a reaction or conversion vessel 40 positioned centrally above a reconditioning vessel 41. Fresh granular solid catalyst, for example synthetic silica-alumina beads falling in the size range about 4–10 mesh, at a temperature suitable for the desired conversion, gravitates from a supply hopper 61 downwardly as a substantially compact seal stream through a conduit 51. Catalyst from the seal stream discharges into a seal chamber 52, which is supplied with seal gas through passage 58 at a pressure slightly above the pressure in the upper end of reactor 40 by controlling the rate of seal steam admission therethrough with a diaphragm valve 59 operated in response to differential pressure controller 60. Catalyst, with some seal gas, passes from seal chamber 52 into the upper end of reactor 40, which may be maintained at a pressure of about 10 pounds per square inch gauge, for example. The catalyst entering the reactor via pipe 53 may be at a temperature of 1030° F., for example. The catalyst gravitates through the reaction or conversion zone within reactor 40 as a substantially compact bed. Vaporized hydrocarbon charge is supplied to the reactor by means of conduit 56. These vapors may comprise a petroleum gas oil fraction boiling in the range about 450–850° F., for example, and the vapor stream may enter the reactor at about 790° F. If desired, a liquid hydrocarbon charge may also be supplied either admixed with the vapor or through a separate conduit 57. Hydrocarbon charge passes downwardly through the bed in the conversion zone and is converted to the desired gaseous products. The term "gaseous" is used herein, when referring to either products or reactants, to refer to a material in the gaseous phase under the existing conditions of temperature and pressure, regardless of what may be its state under normal atmospheric conditions. The gaseous products are removed through conduit 32. The products may be discharged from the bed by any of a number of suitable arrangements used in conjunction with conduit 32, such as those shown in Simpson et al., U. S. Patent No. 2,336,641, or Bergstrom, U. S. Patent No. 2,458,498. The used catalyst is purged free of adhering hydrocarbons by means of an inert gas admitted through passage 33. It is then passed downwardly through conduit 42 into a depressuring chamber 43, wherein the pressure is reduced to the pressure in the reconditioner 41 by removal of purge gas through passage 34. Catalyst then gravitates through passage 44 into the upper section of reconditioner 41. The particular reconditioner shown is a catalyst regenerator. The granular solid catalytic contact material passes through the reconditioner as a substantially compact bed. A combustion supporting gas, such as air, is admitted centrally to the bed through passage 35 to burn from the contact material the carbonaceous contaminants deposited therein in the reaction zone. This air flows upwardly through the upper section of the bed and downwardly through its lower section. Flue gas produced by the burning is removed through passages 36 and 37. The temperature within the bed is maintained below the level at which the catalyst would be permanently damaged by means of a suitable cooling fluid circulating through cooling coils 38. Other reconditioner constructions than that shown may be used. For example, if the contact material is substantially inert in character, the reconditioner may take the form of a heater. Reconditioned catalyst is purged by means of inert purge gas admitted through passage 39 and then gravitated downwardly as a seal stream through conduit 45 into a vent chamber 46. Inert purge gas is removed from the vent chamber through conduit 50. The contact material then gravitates through the passage 47 into a lift tank 48. A suitable lift gas, such as air, flue gas or steam, is admitted to the lift tank through passages 54 and 55. Catalyst is mixed with the lift gas in the tank and then transported by the gas up a lift pipe 62 into separator 61. In the separator, lift gas is separated from the catalyst and is removed through passage 43 while the catalyst settles to the bottom of the separator to be returned to the reactor.

The details of one form of this invention which may be utilized in the upper section of the reactor are shown in Figures 3, 4, 5 and 6, which are best considered together. Conduit 53 extends into the upper section of reactor 40 and terminates therein in a position so as to discharge contact material into a centrally located open-top cylindrical receptacle 63. Beneath receptacle 63 is a frusto-conical shaped partition 64 extending completely across the reactor. Extending through this partition and downwardly to a level substantially below the partition within the reactor are a plurality of conduits 65. Each of these conduits is split on its lower end into four branches 66, and each branch has attached to its lower end a catalyst distributor 67. These distributors are best seen by reference to Figures 5 and 6, which are a sectional and plan view respectively, of one distributor. It will be seen there that each distributor consists of an upper chamber 68 with three uniformly spaced rectangular-shaped passages 69 extending from the lower section thereof. Metal spacings bars 70 extend from the outside of each distributor.

In operation, fresh granular contact material, at a temperature suitable to effect the desired conversion reaction, passes into receptacle 63 from passage 53. Contact material flows outwardly from the lower section of the receptacle as a frusto-conical shaped stream over partition 64. This stream is confined over most of its length by a roof 71. Contact material gravitates from this stream and from the lower section of the accumulation within receptacle 63 as a plurality of spaced-apart streams within passages 65. Each of these streams is split into four separate segments by branch members 66, and each segment discharges into chamber 68 of distributor 67. Contact material is discharged from each distributor as three separate rectangular-shaped streams through passages 69 onto the surface of the downwardly gravitating compact reaction bed 23. Passages 69 are spaced apart a distance less than about 20 inches center-to-center, this limitation holding for those of passages 69 which extend from the same distributor as well as passages extending from different adjacent distributors. Those of passages 69 which are adjacent the walls of vessel 40 should be spaced a distance less than 10 inches from the center of the passage to the wall. Preferably, the center-to-center distance should be less than about 10 inches, and still more preferably it should be less than about 7 inches. The upper surface of bed 23 is, of course, maintained at the level of the lower ends of passages 69, so that a plenum space 72 is defined above the bed below partition 64. A vaporized hydrocarbon charge, at a temperature substantially below the temperature at which contact material is supplied to bed 23, is admitted to this plenum space through passage 56. This vaporized charge passes downwardly into the upper end of bed 23 in the area between distributors 67 and between passages 69 of each of distributors 67. To avoid disruption of the contact material bed, it is necessary that this area of supply of vaporized charge, that is, the horizontal area between passages 69 of all distributors, be greater than about 2 percent of the total horizontal cross-section of bed 23. To avoid contact material hold-up within passages 69, these passages should have a minimum lateral dimension in all directions greater than about 1.5 inches, and preferably greater than about 3 inches. The vaporized charge then passes downwardly through bed 23 to effect the desired conversion. By maintaining the spacing of the contact material inlet passages 69 within the above critical limit, excessive temperature gradients across the bed are avoided.

As an example of the beneficial results obtained with this invention, consider the catalytic conversion of a petroleum gas oil using the system of Figures 3 to 6, and the charge conditions given as an example in connection with Figure 2. The gas oil might be charged at the rate of 18,000 barrels per day and the catalyst at a rate of 350 tons per hour. Under these conditions, with the best prior art wide spacing of about 39 inches for catalyst inlet passages, the maximum temperature across the reaction bed at a level 2½ feet below its upper end might typically be about 988° F., while the minimum temperature at this level might be about 766° F. With this spacing, at the level of product removal ten feet below the upper surface of the bed, the maximum temperature might be about 965° F. and the minimum about 771° F. However, when the system of Figures 3 to 6 is used with passages 69 spaced about 6 inches center-to-center, the maximum temperature at the 2½ foot level typically would be about 894° F. and the minimum 869° F. At the level of product removal, the maximum would be about 865° F. and the minimum 864° F. The marked improvement is obvious.

A somewhat simplified form of this invention is shown in Figure 7. There, a transverse partition 75 extends across the upper section of the reactor so as to define a seal chamber 76 thereabove and a conversion chamber 77 therebelow in the lower section of the reactor. Contact material gravitates into the seal chamber through passage 53 and accumulates on partition 75. Seal gas may be admitted through passage 78. Downwardly gravitating, substantially compact bed of contact material 23 is maintained within the lower section of chamber 77. Contact material is supplied to the upper surface of this bed through a plurality of vertically extending passages 79. These passages are spaced apart a distance less than 20 inches center-to-center. Vaporized charge, at a temperature substantially below the contact material supply temperature, is supplied to the plenum space defined above bed 23 by passages 79 through conduit 56. This vaporized charge then passes downwardly into bed 77 in the area between passages 79.

Another form of this invention is illustrated in Figure 8, wherein transverse partition 80 extends across reactor 40 at a level intermediate the upper and lower ends of the reactor so as to form seal chamber 76 in the upper end and conversion chamber 77 in the lower section. Partition 80 is equipped with a plurality of uniformly spaced-apart orifices 81, which have lateral dimensions in all directions greater than about 1.5 inches, and preferably greater than about 3 inches. Contact material is supplied to the seal zone through passage 53 to form a substantially compact accumulation of contact material therein. Contact material passes from this accumulation as a plurality of uniformly spaced-apart streams through orifices 81 onto the surface of compact reaction bed 23. The normal angle of repose assumed by the contact material after passage through these orifices causes a plenum space 82 to be formed between the upper end of bed 23 and partition 80. This angle of repose for most contact materials will be within the range 25 to 45 degrees with the horizontal and is usually about 30 degrees with the horizontal. Vaporized hydrocarbon charge, at a temperature substantially below the contact material temperature, is supplied to this plenum space through passage 56. This vapor passes into the upper end of bed 23 and then downwardly therethrough to effect the desired conversion. Orifices 81 are spaced apart a distance less than about 20 inches center-to-center, and preferably less than about 10 inches center-to-center, and still more preferably less than about 7 inches center-to-center. The distance from the center of any orifices adjacent the wall of vessel 40 to that wall is less than about 10 inches, and preferably less than 5 inches and still more preferably less than 3.5 inches.

Still another form of this invention is shown in Figure 9. Transverse partition 75 extends across the upper section of reaction vessel 40 so as to divide it into a seal chamber 76 thereabove and a conversion chamber 77 therebelow. A plurality of conduits 83 extend downwardly from this partition and terminate on a common level therebelow. Extending centrally across conversion chamber 77 is a transverse partition 84, which is equipped with a plurality of conduits 85 extending downwardly therefrom to a common level therebelow. Extending upwardly from partition 84 are vapor distributors 86. Granular contact material, at a temperature suitable to effect the desired conversion, is supplied to seal chamber 76 by means of passage 53. Contact material accumulates in the seal chamber on top of partition 75 and is continually removed from the lower section of this accumulation into the upper section of conversion chamber 77 by means of conduits 83. Contact material passes through the conversion zone in chamber 77 as a substantially compact bed 23 and is removed from the lower section of the chamber through passage 45. Bed 23 is split in the middle by partition 84, and contact material passes from the upper half of the bed to the lower half through passages 85, which extend a sufficient distance below the partition to form a plenum space 87 within the bed. Vaporized hydrocarbon charge, at a temperature below the contact material temperature, is supplied to plenum space 87 through passage 56. Passages 85 are spaced apart within the critical limits previously mentioned. A portion of the vaporized charge passes downwardly through the lower half of bed 23 below the lower ends of passages 85 and is converted to the desired gaseous products. These products are collected underneath an inverted trough collector 88 and removed from the lower section of the reactor thereby. Products are removed from the trough continuously through passage 89. The remainder of the gaseous reactants pass upwardly from plenum space 87 through distributors 86 into the lower section of the upper half of bed 23. This portion of the charge is converted by upward passage through the upper half of the bed and products are removed through conduit 90. It will be noted that in this form of the invention the vaporized charge is supplied centrally within the reaction bed rather than at its upper end. This, in effect, makes for two separate reaction beds within the reactor, one the lower half of bed 23 through which charge passes concurrently, and the other the upper half of bed 23 through which the charge passes countercurrently.

Figures 10 and 11, which are best considered together, present a somewhat different form of this invention than that shown in the previous drawings. In this form, it is the vaporized charge which is supplied to the reaction bed as a plurality of streams spaced apart within a critical limitation with the contact material being supplied in the area between said streams, rather than the contact material being supplied as a plurality of streams with the vapor passing between the streams as in the previous forms of the invention. The equivalency of these two forms will be apparent from the following discussion.

Referring to Figures 10 and 11, contact material is supplied to a cylindrical receptacle in the upper section of reactor 40 through a passage 53. Frusto-conical partition 64 extends across the reactor at a level below receptacle 63, so that contact material from the receptacle will expand outwardly over the surface of partition 64. A transverse partition 91 extends across vessel 40 at a level substantially below partition 64, so that a gas plenum space 93 is defined between partitions 64 and 91, and a conversion chamber 77 is defined below partition 91 in the lower section of reactor 40. Contact material gravitates from the accumulation on partition 64 substantially vertically downwardly as a plurality of confined streams through conduits 92. Conduits 92 extend entirely through plenum space 93 and discharge contact material into the upper section of conversion chamber 77 to supply downwardly gravitating, substantially compact bed 23 therein. A vaporized hydrocarbon charge, at a temperature substantially below the contact material temperature, is supplied to plenum space 93 through passage 56. This vaporized charge passes downwardly into the conversion chamber through pipes 94, which terminate on a common level below the upper surface of bed 23 by at least 6 inches. These pipes are uniformly spaced across the entire horizontal cross-section of reactor 40, so that there is a distance less than 20 inches center-to-center, and preferably less than 10 inches, and still more preferably less than 7 inches center-to-center. Pipes adjacent the walls of vessel 40 should be spaced a distance less than about 10 inches, and preferably less than about 5 inches, and still more preferably less than about 3.5 inches from the center of these pipes to the wall. Pipes 94 and the vapor streams being emitted therefrom should occupy an area within conversion chamber 77 and bed 23 therein at least equal to about 2 percent of the horizontal cross-section of the bed 23. There should be an edge-to-edge distance between any one conduit and any other of at least 1.5 inches, and preferably at least 3 inches, so that contact material flow between the pipes will not be impaired. It should be noted that the term "contact material bed" is used broadly herein to cover the entire length of an accumulation like 23 from its upper surface to its lower end and also to mean the reaction bed proper, which is that portion of the bed lying below the level of the vapor introduction, this last being the actual reaction bed. The description and claims should be understood in the light of this broad usage, and which of the actual meanings is being used is always obvious from the context.

A further modified form of this invention is shown in Figure 12. Reactor 40, there, is provided with an upwardly tapered symmetrical roof 95, which may take the form of a cone or pyramid, depending upon the cross-sectional shape of the main body of reactor 40. Contact material supply conduit 53 connects into the apex of this roof and contact material gravitates through conduit 53 to supply bed 23 within the reactor 40. The sides of roof 95 make angles with the horizontal greater than the angle of repose of the contact material so that, when contact material from passage 53 expands outwardly to supply bed 23, it does not so expand in free surface flow. By this means segregation of the contact material, according to particle size, is substantially avoided. This segregation does occur to a marked extent when the particles expand over a free surface, the finer particles concentrating in the area below the point at which expansion begins, while the coarser particles concentrate in the area where the expansion ends, in a manner well known in the art. Spaced apart entirely across reactor 40, at a level below the lower end of roof 95, are a plurality of gas distribution channels 96 in the form of inverted troughs. These troughs are spaced center-to-center within the critical limitations previously given. Conduit 97 extends laterally across vessel 40 and connects into each of these troughs through orifices 98. Where reactor 40 is of rectangular cross-section, troughs 96 may extend completely across the vessel from wall to wall. Where reactor 40 is circular in cross-section, troughs 96 will preferably take the form of successively larger annular rings. The vaporized hydrocarbon charge, at a temperature substantially below the contact material temperature, is supplied to troughs 96 by means of pipe 97 and orifices 98. Vaporized charge passes into the bed as a plurality of streams of critical spacing which expand outwardly across the bed and pass downwardly through the bed to effect the desired conversion.

Still another form of this invention is shown in Figure 13. Supply passage 53 extends into the upper end of reactor 40 and has attached to its lower end an upwardly tapered, symmetrical hood 99, which serves to divide the vessel into a gas plenum space 100 thereabove and a reaction chamber 77 therebelow. The sides of hood 99 make angles with the horizontal greater than the angle of repose of the contact material, so that free surface flow, with resultant segregation of the contact material, is avoided as the contact material issues from supply passage 53 and spreads itself over the bed. A plurality of conduits 101, spaced apart a distance less than the critical limitations of this invention, pass through hood 99 to a level within chamber 77 substantially below the hood. In operation, a vaporized charge, at a temperature substantially below the contact material supply temperature, is passed into plenum space 100 through passage 56. This vaporized charge then passes into conversion chamber 77 and bed 23 therein through passages 101 and then passes downwardly through bed 23 to effect the desired conversion. The method and apparatus of Figure 13 which uses plenum space 100, hood 99, and pipes 101, is described and claimed in detail in U. S. patent application Serial No. 338,773, filed February 25, 1953. However, the broader claims presented herein also cover generically the method and apparatus of Figure 13 when the required spacing of this invention is employed.

A further modified form of this invention is shown in Figure 14. In that figure a plurality of uniformly spaced-apart, angle-roofed, inverted gas distributor troughs 102 are spaced apart across the conversion vessel 77 at a level such that the bottom of the uppermost trough is at least 6 inches below the upper surface of compact bed 23. These troughs are arranged on a plurality of levels within the upper section of the conversion chamber. There is a distance of at least 1.5 inches, and preferably at least 3 inches between adjacent troughs on the same level, and the total area occupied by the lower ends of all of the troughs amounts to at least 10 percent of the total horizontal cross-sectional area of vessel 40. The troughs are so further arranged that the projections of the lower ends of the troughs on a single horizontal plane are spaced apart a distance less than about 20 inches center-to-center, and preferably less than about 10 inches, and still more preferably less than about 7 inches center-to-center. The vaporized charge is supplied to troughs 102 through conduits 103 and passes into bed 23 through the lower ends of the trough. From the standpoint of avoiding temperature gradients across the reaction bed, which will lie below the lowermost row of troughs, there is no limit on how widely apart vertically the rows of the troughs may be. However, from a practical viewpoint, in order to avoid adding unduly to the height of the reactor and to avoid an undue amount of conversion occurring in the vertical space between the rows of troughs, it is desirable to have the rows quite close together. A vertical distance within about 10 inches between adjacent rows of troughs is desirable.

The use of the system of vapor and granular solids feed of this invention in conjunction with a system for the supply of a liquid hydrocarbon charge to the reactor of the type described and claimed in U. S. patent application, Serial No. 633,623, filed January 11, 1957, is illustrated in Figure 15. Contact material is supplied to cylindrical receptacle 63 in the upper section of reactor 40 through passage 53. Contact material passes from the lower section of the accumulation within this receptacle vertically downwardly through passage 104 and then expands outwardly underneath hood 105. Baffles 106 are arranged within hood 105 in such a manner as to cause the contact material flowing in the lower section of the hood to pass downwardly as a narrow, peripheral, high velocity region 107 flowing along the wall of the hood and a central lower velocity region 108. Liquid hydrocarbon charge, at a temperature substantially below the contact material temperature, is supplied to a ring manifold 109 situated within region 107 by means of conduit 57. Liquid passes from the ring through a plurality of orifices (not shown) into the narrow, peripheral flow region 107 and liquid and contact material are mixed as they pass through region 107. Any vapors formed flow laterally into region 108. The contact material from both regions 107, 108 passes onto an accumulation of contact material 110 maintained below hood 105 within a cylindrical receptacle 111, which receptacle is of somewhat less lateral dimensions than reactor 40. Extending downwardly from the bottom of receptacle 111 are a plurality of contact material supply pipes 112, which are spaced apart a distance less than the critical limit defined by this invention. Contact material flows downwardly through these pipes to supply reaction bed 23. Vaporized hydrocarbon charge, at a temperature substantially below the contact material temperature, is supplied through either of conduits 56 or 56' and then passes into bed 23 in the area between pipes 112. Those of pipes 112 which lie directly below hood 105 are made longer than the remainder of pipes 112 in order to compensate for the difference in temperature of the contact material, which is caused by mixing a portion of it with cooler liquid charge in region 107. This development is described and claimed in U. S. patent application, Serial No. 333,488, filed January 27, 1953, now U. S. Patent No. 2,808,367. The total hydrocarbon charge passes downwardly through reaction bed 23 to effect the desired conversion.

The combination of this invention with another conventional liquid feed system is illustrated in Figure 16. A plurality of compact contact material streams gravitate from seal chamber 76 to a level within conversion chamber 77 substantially below the upper end thereof and supply a compact bed of contact material 23. Contact material also gravitates from seal chamber 76 through a central conduit 113. This contact material passes through a slide valve 114, normally kept open, and is dispersed by a central conical baffle 115. Contact material drops from the lower end of the baffle onto the upper surface of bed 23 as a tubular shower of freely falling particles. Liquid hydrocarbon charge, at a temperature substantially below the contact material temperature, is supplied into this shower by means of spray device 116, which is supplied with liquid through passage 57. Vaporized hydrocarbon charge, at a temperature substantially below the contact material temperature, is supplied to bed 23 at a level at least 6 inches below its upper end as a plurality of streams issuing from inverted gas distributor troughs 96. These distributor troughs are spaced apart in size according to the critical limits of this invention and are supplied with vapor by means of passage 97.

As previously stated, the method of supplying granular solids to a bed thereof through one or more confined passages, with the reactant passing into the bed in the area around the passages, is equivalent to supplying the reactant to the bed as one or more confined passages with the granular solids entering the bed around the reactant passages. The equivalency of these two methods will be apparent when it is remembered that the reaction bed proper in a concurrent flow system only begins at the level at which reactants enter the compact bed of the granular solids. Thus, where more than one inlet passage of either type is being used, there will be, along any horizontal line at the level of reactant entry, alternate areas of reactant and granular solids supply regardless of which method is used. Thus, either the reactant or granular solids supply passages must be spaced, within this invention, a distance less than about 20 inches center-to-center, and preferably less than 10 inches, and still more preferably less than 7 inches center-to-center. Obviously, when the spacing of either set of passages within this limit is fixed, the spacing of the other set of inlet areas is automatically fixed at the same value. Where spacing is within the broad limit given above, both reactant and granular solids inlet streams must have at least one lateral dimension which is less than 20 inches, preferably less than 10 inches, and still more preferably less than 7 inches. Also, since by definition the term "center-to-center" means the distance from a line in the horizontal plane of the lower end of any one passage, which line extends down the longer axis of symmetry to a point on each end which is equidistant from the wall of the passage in front, perpendicular to the axis, and the two sides running in the same general direction as the axis, to a similar line in any adjacent passage, the lateral flow of both granular solids and gaseous reactants is limited by the required spacing to less than 10 inches, preferably less than 5 inches, and still more preferably less than 3.5 inches each.

The marked advantage of this invention over prior art is illustrated by Figure 17. There, are shown three separate curves for three separate charge stocks, each of which curves shows the value of product than can be obtained by cracking the particular charge at any given temperature. These curves are all for particular conditions of conversion, as shown in the following table:

| Curve | A | B | C |
| --- | --- | --- | --- |
| Charge Stock Source | Mid Continent Crude 44.5–98.5% Vol. Cut. | Mixed Gas Oil | Mirando Crude 4.5–94.8% Vol. Cut. |
| Charge Gravity, ° API | 29.6 | 31.4 | 22.2. |
| Charge Boiling Range, ° F | 200–954 | 212–760 | 360–861. |
| Catalyst Type | Silica-Alumina Beads with 0.15% $Cr_2O_3$. | Silica-Alumina Beads with 0.15% $Cr_2O_3$. | Silica-Alumina Beads with 0.15% $Cr_2O_3$. |
| Average Particle Diameter of Catalyst, Inches | 0.13 | 0.13 | 0.13. |
| Catalyst Inlet Temp., ° F | 1,030 | 1,030 | 1,030. |
| Catalyst Inlet Rate, Tons/Hr | 315 | 315 | 315. |
| Charge Vapor Inlet Temp., ° F | 790 | 790 | 790. |
| Charge Vapor Inlet Rate, Bbl./Day | 17,900 | 17,900 | 17,900. |
| Pressure of Conversion, p. s. i. g | 10 | 10 | 10. |

The temperature of conversion is taken to be the temperature 2½ feet below the upper end of the reaction bed proper, that is, below the level of supply of hydrocarbon charge to the bed in the reaction zone. It is apparent from these curves that the value of product varies widely depending on the temperature of the reaction bed at the 2½ foot level, and that under the particular conversion conditions chosen here that the optimum conversion temperature is 863° F. in each case. Thus, it would be desirable to convert all the charge at this temperature. However, under prior art systems which utilized catalyst feed pipes spaced, at best, 39 inches apart, or vapor channels spaced, at best, 44 inches apart, temperatures across the bed at the 2½ foot level varied between the temperatures marked by the points G—G on each curve. This means that conversion took place all around the curve between these two points. Hence, the average value of the product obtained was an average of all these conversions at the widely different temperatures. Points E—E demonstrate the temperature range obtained when a spacing of 6 inches center-to-center, within applicants' preferred 7 inch spacing, of catalyst inlet pipes is used. When this is done, the conversion only takes place around that portion of the curve between points E—E. The values of the product obtained by this means will be the average of these conversions and will very closely approach the maximum possible value of product that may be obtained from the particular product, obviously much higher than the value of product from the prior art practice. Points F—F define the temperature of conversion when vapor channels, spaced 6 inches apart center-to-center, are used in the same manner that points E—E show the advantage of close catalyst pipe spacing. The close proximity of points E—E to points F—F demonstrates the equivalency of the two systems. When catalyst feed pipes are spaced on 10 inch centers, the conversion takes place between points H—H while, when vapor inlet channels spaced on 10 inch centers are used, the conversion takes place between points J—J. Both of these spacings are obviously superior to the prior art wide spacing.

Figure 18 illustrates in a different and more general way the criticalness of the spacing limits of this invention. Thus curve illustrates the increase in product revenue that may be obtained by closer spacing of contact material inlet passages or reactant inlet passages by use of this invention. The increase in product revenue is taken to be zero for the old prior art spacing of about 39 inches and the increase is expressed as percent of the maximum possible increase, since the maximum possible increase will vary with the particular charge stock, as shown in Figure 17, and with the particular reaction conditions. It is apparent from Figure 18 that there is no marked advantage in closer spacing until the spacing becomes less than 20 inches, at which point the curve turns sharply upwardly.

Figure 19:
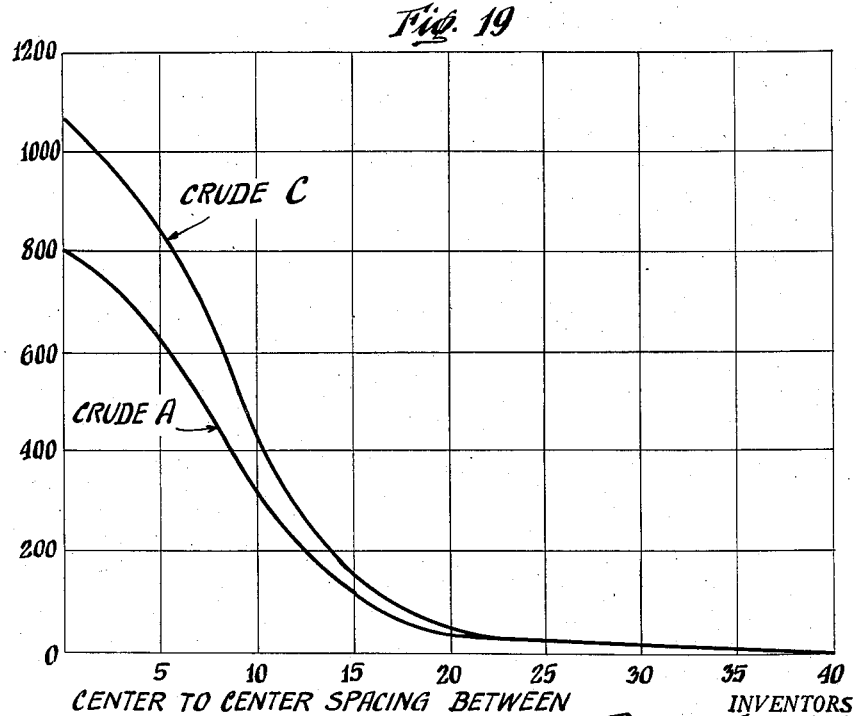
Figure 19 is a graph illustrating the added revenue from two different crude charge stocks achieved by utilizing this invention over the prior art wide spacing.

The increase in product revenue that can be realized on two particular charge stocks by the use of this invention over the prior art is shown in Figure 19. The conditions of conversion are shown in the following table:

| Curve | A | B |
| --- | --- | --- |
| Charge Stock Source | Mid Continent Gas Oil 44.5–89.5% Vol. Cut. | Mirando Crude 4.5–94.8% Vol. Cut. |
| Charge Gravity, ° API | 29.6 | 22.2. |
| Charge Boiling Range, ° F | 200–954 | 360–861. |
| Catalyst Type | Silica-Alumina Beads with 0.15% $Cr_2O_3$. | Silica-Alumina Beads with 0.15% $Cr_2O_3$. |
| Average Particle Diameter of Catalyst, Inches. | 0.13 | 0.13. |
| Catalyst Inlet Temp., ° F | 1,030 | 1,030. |
| Catalyst Inlet Rate, Tons/Hr | 315 | 315. |
| Charge Vapor Inlet Temp., ° F | 790 | 790. |
| Charge Vapor Inlet Rate, Bbl./Day | 15,000 | 15,000. |
| Pressure of Conversion, p. s. i. g | 10 | 10. |

The prior art usage was again assumed to be 39 inches. It is apparent from these curves that when the spacing is less than 20 inches, very substantial additional revenue is realized.

Previous illustrations of this invention have shown it in operation on a vapor hydrocarbon charge only. However, it is equally applicable to the liquid component of the charge and to systems in which the charge is supplied as a mixture of vapor and liquid. A system of the latter type is shown in Figure 20. There, a hydrocarbon charge is supplied to a manifold 202 as a single stream of mixed liquid and vapor through passage 203. The mixed phase charge then passes through pipes 204 to be injected into the compact reaction bed 23 at a plurality of points. This injection is preferably accomplished in accordance with the teaching of U. S. patent application, Serial No. 536,974, filed September 27, 1955, so that a vapor bubble is formed at each injection point. In order to avoid deleterious temperature differentials across the bed 23, adjacent pipes 204 should be spaced apart within the critical spacing defined herein, that is, less than 20 inches center-to-center, and preferably less than 10 inches and still more preferably less than 7 inches. When this is done the savings in product revenue noted above will be accomplished. If desired, the charge might be supplied totally as a liquid to the device of Figure 20 within the broad scope of this invention. If this is done, however, it is desirable to accompany the charge with sufficient steam to form the vapor bubble at each injection point.

It is, of course, obvious that this invention is applicable to a wide variety of reactions other than hydrocarbon conversions, and also that a wide variety of different apparatus than that shown in the attached drawings may be used to accomplish the invention. The one central requirement is that granular solids or fluid reactant inlet passages be maintained within the aforementioned critical spacing. Certain other requirements, as aforementioned, are imposed by other considerations. Thus, the granular solids inlet passages, whether they be pipes or the area between reactant inlet pipes or channels, should have minimum lateral dimensions in all directions of at least 1.5 inches, and preferably at least 3 inches. This is necessary to avoid any bridging of the solids across an inlet to hold up flow therethrough. In order to prevent disruption of the bed by incoming vapor, the total horizontal area of vapor inlets should be greater than 2 percent, and preferably greater than 40 percent of the horizontal cross-section of the reaction bed. Where the reactants are supplied through inverted troughs or channels, the area of supply should be at least 10 percent, and preferably at least 40 percent of the bed cross-section, while, when the reactants are supplied through pipes, the area of supply should be at least 2 percent, and preferably at least 10 percent of the bed cross-section. The space velocity of the total reactant charge, both gaseous and liquid, should be within the range about 0.5 to 10, and preferably about 1 to 3 volumes of charge (as 60° F. liquid) per volume of reaction bed per hour. The ratio of granular solids to reactant charge on a weight basis should be within the range about 1 to 10, and preferably 2 to 7 parts of solids per part of charge. When vapor supply troughs or pipes are used, they should be situated at a level at least 6 inches below the upper surface of the granular solid bed. Obviously, since the reason for the critical spacing is to prevent cross-flow of the reactants and solids, those of the spaced inlet passages, whether for reactant or granular solids flow, which are adjacent a wall of the conversion chamber, should be less than 10 inches from said wall, and preferably less than 5 inches, and still more preferably less than 3.5 inches.

When this invention is used for hydrocarbon conversions wherein the contact material supplies at least a major portion of the heat required, the contact material should be heated, before entering the conversion zone, to a temperature sufficient to supply the required amount of heat without falling below the desired conversion temperature. Where the contact material has a catalytic effect on the reaction, the temperature thereof on introduction should generally be within the range about 900° F. to 1250° F. Where the contact material serves merely as a heat carrier for a thermal cracking or coking reaction, its charging temperature may range as high as 1700° F. The hydrocarbon charge should be substantially entirely vaporized and should be introduced at a temperature within the range about 650° F. to 900° F.

Considering, as an example, the design of one suitable construction according to this invention made similar to that shown in Figures 3–6 for a catalytic hydrocarbon conversion system, the reactor 40 was 16 feet in diameter. Pipes 65 were 5 inch pipes and there were 32 used.

Each of pipes 65 branched into 4 branches, and a distributor like 67 was attached to the lower end of each branch. These distributors were 13 inches square on the outside at their lower ends. Passages 69 were 2 inches wide and 12¼ inches long on the inside, and the spacing between the 3 passages in each distributor was 5⅛ inches center-to-center. Each distributor was spaced 2¾ inches wall-to-wall from adjacent distributors, which made the spacing between adjacent feed passages in different distributors 5½ inches center-to-center. This reactor was designed to be supplied with catalyst at about 1040° F. and at a rate of 350 tons per hour, while vaporized petroleum gas oil was to be supplied at 790° F. at a rate of 15,000 barrels per day.

In another suitable design of a catalytic hydrocarbon conversion reactor made similar to Figures 10 and 11, the reactor 40 was 16 feet in diameter. Pipes 92 consisted of 40 pipes of 5 inch nominal diameter which extended to a level 1 inch below partition 91. Vapor distributor pipes 94 extended to a level 1 foot, 8½ inches below partition 91. There were 475 of these pipes and they were of 3 inch nominal diameter and were arranged on 8 inch equilateral centers.

This invention should be understood to include all changes and modifications of the examples of the invention herein chosen for purposes of disclosure which do not constitute departures from the spirit and scope of the invention.

We claim:

1. In a process for the conversion of a fluid hydrocarbon over a moving bed of granular solids, wherein the solids and hydrocarbon are supplied at substantially different temperatures to said bed within a confined conversion zone, the method for supplying hydrocarbon and solids to the bed so as to avoid excessive variation in temperatures across the bed, which comprises: supplying granular solids and fluid hydrocarbon at different temperatures to at least two separate adjacent areas of the upper end of the reaction bed proper; flowing a portion of the granular solids laterally from the granular solids supply area across the hydrocarbon supply area and a portion of the hydrocarbon laterally into the bed beneath the solids supply area; dimensioning said supply areas so that the sum of the lateral distance moved by the solids across the hydrocarbon supply area plus the lateral distance moved by the hydrocarbon beneath the solids supply area is less than 20 inches; and removing the products of conversion from the bed at a level below said supply areas.

2. In a process for the conversion of a fluid hydrocarbon over a moving bed of granular solids, wherein the solids and hydrocarbon are supplied at substantially different temperatures to said bed within a confined conversion zone, the method for supplying hydrocarbon and solids to the bed so as to avoid excessive variation in temperatures across the bed, which comprises: supplying granular solids and fluid hydrocarbon at different temperatures to at least two separate adjacent areas of the upper end of the reaction bed proper; flowing a portion of the granular solids laterally from the granular solids supply area across the hydrocarbon supply area and a portion of the hydrocarbon laterally into the bed beneath the solids supply area; dimensioning said supply areas so that the sum of the lateral distance moved by the solids across the hydrocarbon supply area plus the lateral distance moved by the hydrocarbon beneath the solids supply area is less than 10 inches; and removing the products of conversion from the bed at a level below said supply areas.

3. In a process for the continuous conversion of a fluid hydrocarbon charge, at least partially in the liquid phase, in the presence of a downwardly moving, substantially compact bed of granular contact material wherein the fluid charge is supplied to the bed at a substantially lower temperature than contact material is supplied thereto, the method for supplying fluid charge and contact material so as to avoid excessive temperature gradients across the bed, which comprises: supplying granular contact material to the upper section of said bed at a temperature suitable to effect the desired conversion as at least one confined stream, distributing the contact material from said stream across the bed, supplying the fluid hydrocarbon charge at least partially in the liquid phase to the bed through a plurality of inlets discharging below the bed surface and spaced apart so that there is a distance less than 20 inches center-to-center between adjacent inlets passing the hydrocarbon charge downwardly through the bed to effect the desired conversion, withdrawing products of the conversion from the lower section of the bed and removing contact material from the lower section of the bed.

4. The method of claim 3 further limited to the fluid hydrocarbon charge being supplied to the bed as a mixture of liquid and vapor and a vapor bubble is formed beneath each of the charge inlets.

5. A continuous process for the conversion of a vaporized hydrocarbon in the presence of a downwardly moving, substantially compact reaction bed of granular contact material, which comprises: passing vaporized hydrocarbon charge into the upper end of the reaction bed through a plurality of feed areas which are spaced apart a center-to-center distance less than 20 inches; supplying contact material at a temperature substantially different from the hydrocarbon charge to the upper end of the reaction bed in the region between said feed areas, passing vaporized charge downwardly through the bed to undergo the desired conversion; withdrawing the products of conversion from the lower section of said bed and withdrawing contact material from the lower section of said bed.

6. A continuous process for the conversion of hydrocarbons in the presence of a downwardly moving, substantially compact bed of granular contact material, which comprises: maintaining said bed within a confined conversion zone; supplying contact material to the upper section of said bed as a confined feed stream; expanding the contact material from said feed stream laterally across the bed and laterally confining the contact material during the expansion by means of said solid surfaces which slope downwardly and outwardly at angles with the horizontal greater than the angle of repose of the contact material, thereby avoiding free surface flow of contact material across the bed; supplying hydrocarbon charge to said bed through a plurality of spaced-apart areas within said bed below said confining surfaces, said areas being spaced apart a horizontal distance less than 10 inches center-to-center; passing the hydrocarbon charge downwardly through the bed to effect the desired conversion; removing products of conversion from the lower section of said bed and removing contact material from the lower section of the bed.

7. In a process for the conversion of a vaporized hydrocarbon charge in the presence of a downwardly moving, substantially compact bed of granular contact material, wherein contact material is supplied at a temperature substantially different from the vaporized charge, the method for supplying vaporized charge and contact material to the bed so as to avoid excessive temperature variation across the bed, which comprises: passing contact material onto a plurality of areas on the upper surface of said bed which are spaced apart a center-to-center distance less than 20 inches; distributing the contact material from said areas laterally across the bed; supplying vaporized charge at a temperature substantially different from the contact material supply temperature to the bed uniformly in the region between said areas; passing vaporized charge downwardly through the bed to effect the desired conversion; withdrawing the products of conversion from the lower section of the bed and withdrawing contact material from the lower section of the bed.

8. In a process for the conversion of vaporized hydrocarbon charge in the presence of a downwardly moving, substantially compact bed of granular contact material, wherein contact material is supplied at a temperature substantially above that of the vaporized charge, the method for supplying vaporized charge and contact material to the bed so as to avoid excessive temperature variation across the bed, which comprises: passing contact material at a temperature suitable to supply the heat required by the desired conversion reaction to a plurality of areas on the upper surface of said bed which are spaced apart a center-to-center distance less than 20 inches; distributing contact material from said areas laterally across the bed; supplying vaporized charge at a temperature substantially below the temperature of the contact material to the bed in the region between said areas at about the level of said areas; passing the vaporized charge downwardly through the bed to effect the desired conversion to gaseous products and withdrawing the gaseous products from the lower section of the bed and withdrawing used contact material from the lower section of the bed.

9. In an apparatus for the conversion of hydrocarbon reactants in the presence of a bed of moving granular solids maintained within an enclosed conversion chamber wherein solids and reactants are supplied to the bed at substantially different temperatures, the improved apparatus for supplying solids and reactants to the bed, which comprises in combination: members defining at least two passageways for the supply of granular solids terminating within the upper section of said chamber, each of said passageways having lateral dimensions in all directions greater than 3 inches and the distance from a line in the horizontal plane of the lower end of any one of said passageways which extends down the longer axis of symmetry of the lower end of said passageway in said plane from a point which is equidistant from one end and the two sides of the lower end of the passageway to a point equidistant from the opposite end and two sides of the lower end of the passageway, to a similar line in the lower ends of all adjacent passageways being less than about 7 inches and the distance from said line in passageways adjacent the walls of said vessel to said wall being less than 3.5 inches and the total horizontal area between said passageways and said passageways and said wall amounting to at least forty percent of the horizontal cross-section of said chamber; means for supplying hydrocarbon reactants to said bed at a level adjacent the lower ends of said passageways, and means for removing products of conversion from said bed at a level substantially below the lower ends of said passageways.

10. In an apparatus for the conversion of hydrocarbon reactants over a moving bed of granular solids wherein solids and reactants are supplied at substantially different temperatures to the bed within an enclosed conversion chamber, the improved apparatus for supplying solids and reactants to the conversion chamber so as to avoid excessive differences in temperature across the bed, which comprises in combination: members defining a plurality of passageways for the supply of granular solids extending into the upper section of said conversion chamber and terminating therein on a common level, said passageways being spaced apart a center-to-center distance less than about 20 inches and each of said passageways having lateral dimensions in all directions greater than about 1.5 inches and the distance from the center of any passageway adjacent a wall of said chamber to said wall being less than 10 inches, said passageways being so spaced that the area of the horizontal cross-section of the conversion chamber which lies between said passageways and between said passageways of said wall is greater than about two percent of the total horizontal cross-sectional area of the reaction chamber, means for supplying hydrocarbon reactants to said chamber at a level above the lower ends of said passageways, and means for removing products of conversion from said chamber at a level substantially below the lower ends of said passageways.

11. An apparatus for the continuous conversion of vaporized hydrocarbons in the presence of a downwardly gravitating, substantially compact bed of granular contact material, which comprises in combination: an enclosed conversion chamber adapted to confine said bed in its lower section, a plurality of uniformly spaced-apart substantially vertical conduits for the supply of contact material extending into the upper end of said chamber and terminating therein on a common level substantially below said upper end, the lateral distance from the center of any one of said conduits to the center of all adjacent conduits being less than about 7 inches, while the distance between the center of each of said conduits adjacent the wall of said chamber and said wall is less than about 3.5 inches, each of said conduits being at least 3 inches in each lateral dimension and the horizontal area between said conduits being at least forty percent of the total horizontal cross-section of said chamber, members defining a passageway for the supply of vaporized hydrocarbon charge to said chamber at a temperature substantially below the temperature of supply of contact material extending into said chamber at a level above the lower ends of said conduit, means for removing gaseous products of conversion from the lower section of said chamber, and means for removing contact material from the lower section of said chamber.

12. An apparatus for the continuous conversion of fluid hydrocarbons in the presence of a downwardly gravitating, substantially compact bed of granular contact material, which comprises in combination: an enclosed conversion chamber adapted to confine said bed in its lower section, a plurality of conduits for the supply of contact material at a temperature suitable to effect the desired conversion, said conduits extending into the upper section of said chamber and terminating therein, a contact material distributor of rectangular cross-sectional shape connected to the lower end of each of said conduits, a plurality of rectangular passageways extending from the bottom of each of said distributors to a level shortly therebelow, the distance between a line drawn down the long axis of symmetry of the lower end of any one of said passageways in the horizontal plane of the lower end of said passageway from a point equidistant from one end and two sides of the lower end of said passageway to a point equidistant the opposite end and the two sides of the lower end of said passageway to a similar line in the lower end of each adjacent passageway on the same and adjacent distributors being less than 7 inches while the distance from said line in a passageway adjacent a wall to said wall is less than 3.5 inches, said passageways having minimum lateral dimensions in all directions greater than 3 inches and the area between said passageways being at least forty percent of the total horizontal cross-section of said chamber, means for supplying vaporized hydrocarbons at a temperature substantially below the contact material supply temperature to said chamber and to the area between said passageways, means for removing products of conversion from the lower section of said chamber, and means for removing contact material from the lower section of said chamber.

13. In an apparatus for the conversion of hydrocarbon reactants over a moving bed of granular solids maintained within an enclosed conversion chamber wherein solids and reactants are supplied to the chamber at substantially different temperatures, the improved apparatus for supplying the solids and reactants so as to avoid excessive temperature differentials across the bed, which comprises in combination: members defining at least one passageway for the supply of granular solids to the upper section of said chamber, members defining a plurality of inlets for hydrocarbon reactants extending into said conversion chamber and terminating therein on a common level substantially below the lower end of said passageway, said inlets being spaced apart a distance across said chamber less than about 20 inches center-to-center, while the center of the inlets adjacent the walls of said chamber are less than about 10 inches therefrom, but the distance between the adjacent inlets being greater than about 1.5 inches edge-to-edge and the total area occupied by said inlets being greater than about two percent of the horizontal cross-sectional area of said chamber, means for supplying hydrocarbon reactants to said inlets, and means for removing products of conversion from the lower section of said chamber.

14. An apparatus for the continuous conversion of vaporized hydrocarbon charge in the presence of a downwardly gravitating, substantially compact bed of granular contact material, which comprises in combination: an enclosed conversion chamber adapted to confine said bed of contact material, at least one conduit for the supply of contact material at a temperature suitable to furnish the heat required by the desired conversion reaction extending into the upper section of said chamber and terminating therein, a plurality of inverted gas distributor troughs uniformly spaced apart across said chamber with lower ends on a plurality of vertically spaced-apart levels all lying substantially below the lower end of said conduit, said troughs occupying a total area within the upper section of said chamber greater than about forty percent of the horizontal cross-sectional area of said chamber, the projections of the lower ends of said troughs on a horizontal plane being spaced apart uniformly a distance less than about 7 inches center-to-center, while the distance between the troughs on any given level is greater than about 3 inches edge-to-edge and the center of each of said projections adjacent a wall of said chamber being less than 3.5 inches from said wall, means for supplying vaporized hydrocarbon charge to said troughs at a temperature substantially below the temperature of the contact material supplied to said chamber, means for removing gaseous products of conversion from the lower section of said chamber, and means for removing contact material from the lower section of said chamber.

References Cited in the file of this patent

UNITED STATES PATENTS

| | | |
|---|---|---|
| 2,460,151 | Sinclair | Jan. 25, 1949 |
| 2,574,503 | Simpson | Nov. 13, 1951 |
| 2,587,670 | Weinrich | Mar. 4, 1952 |
| 2,646,407 | Lassiat et al. | July 21, 1953 |